(12) United States Patent
Wanezaki

(10) Patent No.: US 10,707,725 B2
(45) Date of Patent: Jul. 7, 2020

(54) BLOWER FOR HEAT EXCHANGE MOTOR

(71) Applicant: SHINANO KENSHI KABUSHIKI KAISHA, Nagano (JP)

(72) Inventor: Makoto Wanezaki, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 373 days.

(21) Appl. No.: 15/724,952

(22) Filed: Oct. 4, 2017

(65) Prior Publication Data

US 2018/0131252 A1 May 10, 2018

(30) Foreign Application Priority Data

Nov. 7, 2016 (JP) .................. 2016-217392

(51) Int. Cl.
| | |
|---|---|
| *H02K 9/06* | (2006.01) |
| *H02K 11/33* | (2016.01) |
| *F04D 25/06* | (2006.01) |
| *F04D 29/053* | (2006.01) |
| *F04D 29/28* | (2006.01) |

(Continued)

(52) U.S. Cl.
CPC .............. *H02K 9/06* (2013.01); *F04D 25/06* (2013.01); *F04D 29/053* (2013.01); *F04D 29/281* (2013.01); *H02K 1/146* (2013.01); *H02K 1/2786* (2013.01); *H02K 5/20* (2013.01); *H02K 7/14* (2013.01); *H02K 11/33* (2016.01);

(Continued)

(58) Field of Classification Search
CPC .......... H02K 9/06; H02K 11/33; H02K 1/146; H02K 1/2786; H02K 1/32; H02K 5/20; H02K 7/14; H02K 21/22; H02K 2211/03; F04D 25/06; F04D 29/053; F04D 29/281
See application file for complete search history.

(56) References Cited

U.S. PATENT DOCUMENTS 6,107,708 A 8/2000 Yamaguchi et al.
6,278,207 B1 * 8/2001 Matsumoto ........... F04D 29/083
310/68 R (Continued)

FOREIGN PATENT DOCUMENTS

| JP | H02-36756 | 2/1990 |
| JP | H10 309069 | 11/1998 |

(Continued)

OTHER PUBLICATIONS

Machine translation of JP-2002112504-A (Year: 2002).*

(Continued)

*Primary Examiner* — Emily P Pham
(74) *Attorney, Agent, or Firm* — Stephen J. Weyer, Esq.; Stites & Harbison, PLLC

(57) ABSTRACT

To providing a blower that can efficiently cool a plurality of motor coils, which is a large heating source of a blushless motor, by directly blowing and circulating a part of blown air generated by the rotation of an impeller to the motor coils through an air blowing channel. When a motor is started, brown air is obtained from an air blowing port provided in a part of a flange portion so as to be opened to a blower case, directly blown to the motor coils formed around pole teeth of a stator core via an air blowing channel communicating with the air blowing port to cool the motor coils, and circulated to an impeller to perform radiation.

4 Claims, 2 Drawing Sheets

(51) Int. Cl.
*H02K 1/14* (2006.01)
*H02K 1/27* (2006.01)
*H02K 5/20* (2006.01)
*H02K 7/14* (2006.01)
*H02K 21/22* (2006.01)
*H02K 1/32* (2006.01)

(52) U.S. Cl.
CPC ............ *H02K 21/22* (2013.01); *H02K 1/32* (2013.01); *H02K 2211/03* (2013.01)

(56) References Cited

U.S. PATENT DOCUMENTS

| | | | | |
|---|---|---|---|---|
| 6,379,126 | B1* | 4/2002 | Konno | F04D 29/646 |
| | | | | 417/354 |
| 7,067,946 | B2* | 6/2006 | Noda | F04D 25/082 |
| | | | | 310/52 |
| 7,227,287 | B2* | 6/2007 | Noda | F04D 25/082 |
| | | | | 310/68 R |
| 8,014,149 | B2* | 9/2011 | Hsu | F04D 25/0606 |
| | | | | 165/121 |
| 8,403,653 | B2* | 3/2013 | Yamamoto | F04D 25/082 |
| | | | | 310/62 |
| 8,587,165 | B2* | 11/2013 | Zahora | F04D 25/082 |
| | | | | 310/52 |
| 8,690,547 | B2* | 4/2014 | Nagamatsu | F04D 29/281 |
| | | | | 417/354 |
| 9,909,591 | B2* | 3/2018 | Tamaoka | F04D 19/002 |
| 10,468,938 | B2* | 11/2019 | Le Goff | H02K 7/14 |
| 10,563,660 | B2* | 2/2020 | Ishizaki | H02K 5/20 |
| 2001/0006598 | A1* | 7/2001 | Tsuchiya | H02K 1/28 |
| | | | | 415/220 |
| 2004/0084974 | A1* | 5/2004 | Nelson | H02K 9/04 |
| | | | | 310/58 |
| 2004/0263009 | A1* | 12/2004 | Noda | F04D 25/082 |
| | | | | 310/71 |
| 2007/0252460 | A1* | 11/2007 | Cheng | F04D 17/04 |
| | | | | 310/90 |
| 2008/0205001 | A1 | 8/2008 | Saito et al. | |
| 2010/0090547 | A1* | 4/2010 | Yano | H02K 5/08 |
| | | | | 310/43 |
| 2010/0133933 | A1* | 6/2010 | Ikaheimo | F04D 25/082 |
| | | | | 310/62 |
| 2015/0108858 | A1 | 4/2015 | Kim | |
| 2018/0156238 | A1* | 6/2018 | Fukuzawa | F04D 29/668 |

FOREIGN PATENT DOCUMENTS

| | | | | |
|---|---|---|---|---|
| JP | H11-332203 | 11/1999 | | |
| JP | 2002-112504 | 4/2002 | | |
| JP | 2002112504 | A * | 4/2002 | ............ H02K 11/33 |
| JP | 2008 267238 | 11/2008 | | |
| JP | 2017-158272 | 9/2017 | | |
| JP | 2018 014846 | 1/2018 | | |

OTHER PUBLICATIONS

Office Action in corresponding Japanese Application No. 2016-217392.

Office Action dated Dec. 18, 2018 in corresponding Japanese Application No. 2016-217392.

Office Action dated Dec. 3, 2018 in corresponding European Application No. 17 194 990.2.

* cited by examiner

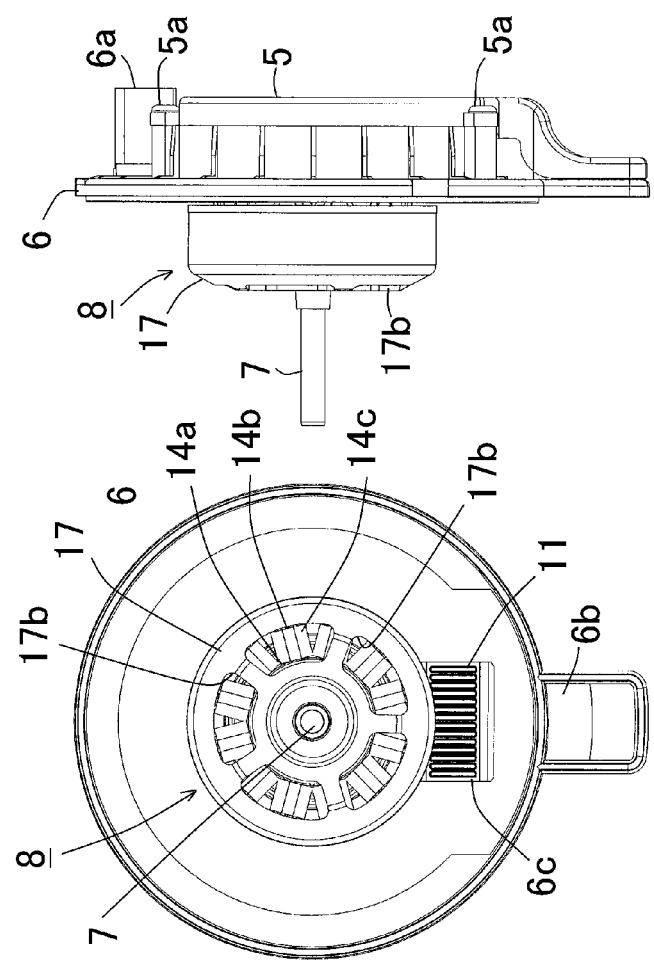

BLOWER FOR HEAT EXCHANGE MOTOR

CROSS-REFERENCE TO RELATED APPLICATION

This application is based upon and claims the benefit of priority of the prior Japanese Patent Application No. 2016-217392, filed on Nov. 7, 2016, and the entire contents of which are incorporated herein by reference.

TECHNICAL FIELD

The present invention relates to a blower used in, for example, HVAC (heating, ventilation, and air conditioning) devices.

BACKGROUND ART

Although a brush motor was used in an air conditioning device for rotating and driving an impeller generating an air flow, a brushless motor is used in recent years. Since a blower motor for HVAC has high output power, an anti-heating measure is necessary to improve the motor efficiency.

Since the motor part and the motor board are assembled as separate bodies in the case of a brush DC motor, a part of air blown by the impeller flows in from an exhaust port called a cooling channel and the air is blown to the entire motor for cooling.

However, since the motor part and the motor board having a motor driving circuit are integrally assembled in the case of a brushless motor, it is not possible to cool only the motor part.

Accordingly, there is proposed an air conditioning device in which the heat generated in a motor control apparatus is radiated to air passing through a heat sink and the heat is radiated to air for cooling the motor and a yoke (see PTL 1: JP-A-2008-207645).

SUMMARY OF INVENTION

Technical Problem

In the structure disclosed in PTL 1, although the radiation fin of a heat sink can be small-sized by diffusing the heat of the motor control apparatus to the blown air and the yoke of a motor, the cooling of the motor itself becomes insufficient.

Solution to Problem

The invention addresses these problems with an object of providing a blower that can efficiently cool a plurality of motor coils, which is a large heating source of a blushless motor, by directly blowing and circulating a part of blown air generated by the rotation of an impeller to the motor coils through an air blowing channel.

The invention has the following structure to achieve the above object.

There is provided a blower including a rotor shaft, a rotor assembled to the rotor shaft, an impeller assembled to the rotor shaft concentrically with the rotor, a blower case housing the impeller, a motor, a driving circuit for driving and controlling the motor, a motor board having the driving circuit, a flange portion rotatably supporting the rotor shaft, and a motor case to which the motor board is assembled, the motor case being integrally assembled to the blower case with the flange portion sandwiched therebetween, a stator core, a plurality of pole teeth, and a plurality of motor coils formed around the pole teeth of the stator core, in which an air blowing port is provided in a part of the flange portion so as to be opened to the blower case, an air blowing channel communicating with the air blowing port is formed between the motor case and the flange portion, heat radiation is performed by starting the motor, obtaining a part of air blown by rotation of the impeller through the air blowing port, and directly blowing the blown air to the motor coils through the air blowing channel and circulating the blown air to the impeller.

In the above structure, when the motor is started, a part of brown air from the impeller is obtained via the air blowing port provided in a part of the flange portion so as to be opened to the blower case, directly blown to the motor coils formed around the pole teeth of the stator core via the air blowing channel (cooling channel) to cool the motor coils, and circulated to the impeller to perform radiation.

Accordingly, a part of blown air generated by the rotation of the impeller is circulated through an air blowing channel formed between the flange portion and the motor case, so that the motor coils, which is a large heating source of the brushless motor, can be cooled efficiently.

When the air blowing channel is configured so that the blown air to the motor coils is circulated to the impeller via a plurality of through holes formed in a top surface of a rotor yoke, since the space close to the top surface of the rotor yoke becomes a negative pressure due to the rotation of the impeller, a part of the brown air circulates through the motor via the through hole as long as the impeller rotates and heat can be efficiently exhausted.

When a heat exchanger is installed on the motor board so as to be exposed to the blower case through the opening of the flange portion in the air blowing channel, the heat exchanger for radiating heat from electronic components provided on the motor board can be cooled efficiently to keep the function. Accordingly, the heat exchanger can be small-sized by reducing the heat capacity.

When the rotor yoke integrally assembled to the rotor shaft is concentric with the impeller facing the rotor yoke so as to be aligned with the impeller in the axial direction within the internal diameter side housing space of the impeller, the blower can be small-sized by suppressing the assembly height in the axial direction of the impeller and the rotor yoke concentrically assembled to the rotor shaft.

Advantageous Effects of Invention

In the blower described above, the motor coils can be efficiently cooled by directly blowing and circulating a part of blown air generated by the rotation of the impeller to the motor coils, which is a large heating source of a blushless motor.

BRIEF DESCRIPTION OF DRAWINGS

FIG. 3A is a plan view in the state in which the impeller has been removed from FIG. 1,
FIG. 3B is a right side view thereof and FIG. 3C is a bottom view, thereof.

DESCRIPTION OF EMBODIMENTS

A blower according to an embodiment of the invention will be described with reference to the attached drawings.

Figure 1:
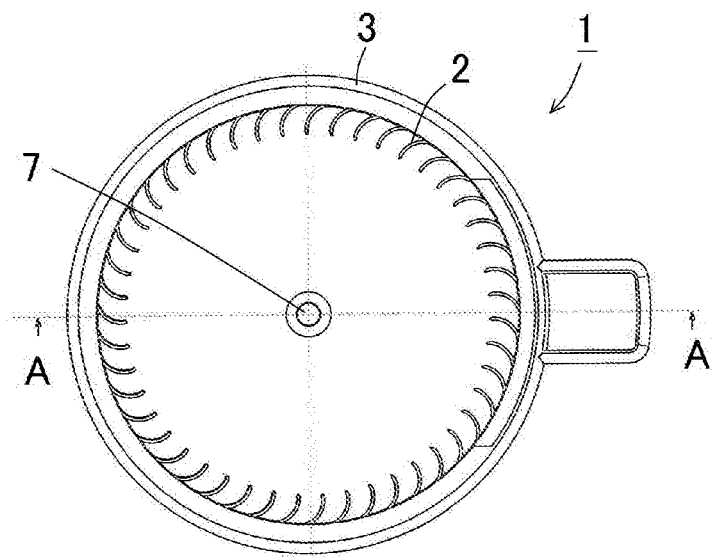
FIG. 1 is a plan view illustrating the blower.

First, the schematic structure of the blower will be described with reference to FIGS. 1 to 3. A DC brushless motor is used as a motor 4 and an outer rotor motor is used in this example. The motor 4 may be an inner rotor motor.

Figure 2:
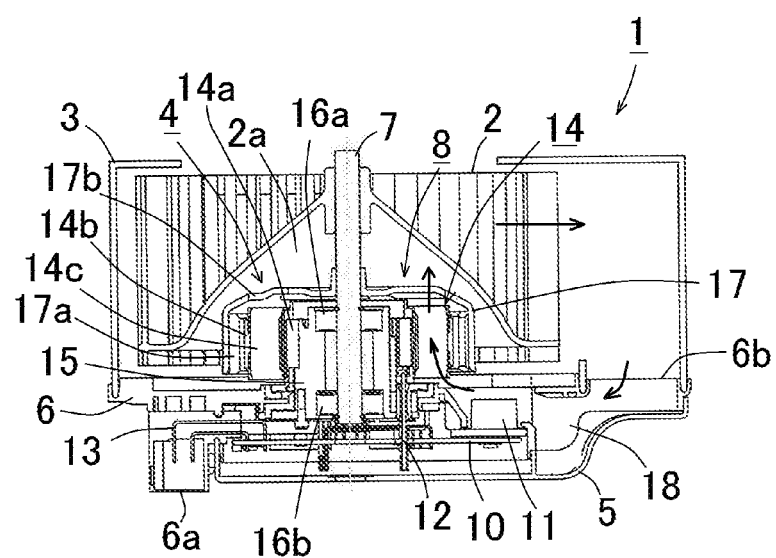
FIG. 2 is a cross sectional view illustrating the blower in FIG. 1 taken along line A-A.

As illustrated in FIG. 2, a blower 1 is configured by integrally assembling a blower case 3 housing an impeller 2 to a motor case 5 supporting the motor 4 via a flange portion 6. The impeller 2 is assembled concentrically with a rotor shaft 7 immediately above the motor 4 having a rotor 8 assembled to the rotor shaft 7. When the motor 4 is started, the blower 1 sucks outside air to the blower case 3 from the axial direction and blows the compressed air from the outer peripheral direction of the impeller 2 (see FIG. 1).

In FIG. 2, a motor board 10 is assembled to the motor case 5. The motor board 10 is provided with a driving circuit for driving and controlling the motor 4. The motor board 10 is provided with a radiator (heat exchanger) 11 for radiating heat generated from electronic components (such as, for example, FETs), circuit components, and the like mounted on the board. The radiator 11 is formed so as to be exposed through an opening 6c provided in the flange portion 6 (see FIG. 3A). In addition, a plurality of coil leads 12 drawn from the motor coils 14c is connected to the motor board 10. In addition, a power feeding terminal 13 is connected to the motor board 10. The motor case 5 is assembled to the flange portion 6 and a connector 6a in which a part of the power feeding terminal 13 is exposed in a connectable manner is formed.

Next, the structure of the motor 4 will be described with reference to FIG. 2. First, the structure of a stator 14 will be described. A cylindrical housing is integrally assembled to the flange portion 6 by screws. A pair of bearing portions 16a and 16b is provided in the cylindrical hole of the housing 15. The pair of bearing portions 16a and 16b rotatably supports the one end side of the rotor shaft 7. In addition, the stator core 14a is assembled to the outer peripheral surface of the housing 15. In the stator core 14a, a plurality of pole teeth 14b projects radially outward from an annular core back portion. The motor coils 14c are formed around the pole teeth 14b.

Next, the structure of the rotor 8 will be described with reference to FIG. 2. A rotor yoke 17 formed in a cup is integrally assembled to the rotor shaft 7 by press-fitting, shrinkage fitting, adhesion, and the like. One end of the rotor shaft 7 passes through the motor board 10 and is retained and supported by the motor case 5. The rotor yoke 17 is aligned with the impeller 2 integrally assembled to the other end of the rotor shaft 7 in the axial direction within an internal diameter side housing space 2a of the impeller 2. Accordingly, the blower 1 can be small-sized by suppressing the assembly height in the axial direction of the impeller 2 and the rotor yoke 17 concentrically assembled to the rotor shaft 7.

The inner peripheral surface of the rotor yoke 17 is provided with an annular rotor magnetic pole 17a. The rotor yoke 17 is assembled to the rotor shaft 7 so that the rotor magnetic poles 17a face the end surfaces (magnetic flux acting surfaces) of the pole teeth 14b of the stator core 14a. As illustrated in FIG. 3A, a plurality of through holes 17b is provided in the top surface of the rotor yoke 17. These through holes 17b form an air blowing channel 18 (cooling channel) through which air circulates from the motor coils 14c to the impeller 2 as described later.

As illustrated in FIGS. 3A to 3C, an air blowing port 6b opened to the blower case 3 is provided on the outer peripheral side of the flange portion 6. As illustrated in FIGS. 3B and 3C, the flange portion 6 and the motor case 5 are integrally assembled to each other by screws 5a. As illustrated in FIG. 2, when the flange portion 6 and the motor case 5 are integrally assembled to each other, a housing space is formed therebetween. This housing space is the air blowing channel 18 communicating the air blowing port 6b with the motor 4. When the impeller 2 rotates, as illustrated by the bold arrows in FIG. 2, a part of brown air is obtained from the air blowing port 6b, passes through the air blowing channel 18, directly blown to the motor coils 14c formed around the pole teeth 14b of the stator core 14a, passes through the through holes 17b of the rotor yoke 17, and circulated to the impeller 2 to perform radiation. Since the space close to the top surface of the rotor yoke 17 becomes a negative pressure due to the rotation of the impeller 2, a part of the brown air circulates through the motor 4 via the through holes 17b as long as the impeller 2 rotates, and heat can be efficiently exhausted.

In addition, as illustrated in FIG. 2, the radiator 11 mounted on the motor board 10 is provided in the air blowing channel 18 so as to be exposed to the blower case 3 through the opening 6c of the flange portion 6. This can improve the cooling function by efficiently cooling the radiator 11 for radiating heat generated from electronic components (for example, high heat generating elements such as FETs) provided on the motor board 10. Accordingly, the radiator 11 could be small-sized by, for example, 20 percent by reducing the heat capacity.

As illustrated in FIG. 2, when the motor 4 is started and the impeller 2 rotates, air is sucked from one end surface in the axial direction of the blower case 3 and the compressed air is blown from the outer peripheral side of the impeller 2. At this time, a part of the compressed air is introduced to the air blowing channel 18 through the air blowing port 6b, cools the radiator 11 present at a midpoint of the air blowing channel 18, cools the motor coils 14c, passes through the through holes 17b in the top surface of the rotor yoke 17, and are exhausted toward the center of the shaft of the impeller 2. The exhausted air is mixed with the air sucked in the axial direction of the blower case 3, compressed from the outer peripheral side of the impeller 2, and brown and radiated.

In the above structure, when the motor 4 is started, a part of the brown air from the impeller 2 is obtained via the air blowing port 6b provided in a part of the flange portion 6 so as to be opened to the blower case 3, directly blown to the motor coils 14c formed around the pole teeth 14b of the stator core 14a via the air blowing channel 18 (cooling channel) to cool the motor coils 14c, and circulated to the impeller 2 to perform radiation. In the experiment, when the motor 4 was operated under a rated load, cooling effects equivalent to approximately 25 degrees were confirmed as compared with the case in which only the impeller is used and the cooling channel is not used.

Accordingly, a part of blown air generated by the rotation of the impeller 2 is circulated through an air blowing channel 18 (cooling channel) formed between the flange portion 6 and the motor case 5 to efficiently cool the motor coils 14c, which is a large heating source of the brushless motor, and the radiator 11.

Although an outer rotor type motor is used in the above example, an inner rotor type motor can also be used as long as the ventilation of a stator yoke can be obtained.

What is claimed is:
1. A blower comprising:
a rotor shaft;
a rotor assembled to the rotor shaft;

an impeller assembled to the rotor shaft concentrically with the rotor and provided immediately above the rotor;

a blower case housing the impeller;

a motor;

a driving circuit for driving and controlling the motor;

a motor board having the driving circuit;

a flange portion rotatably supporting the rotor shaft;

a motor case to which the motor board is assembled, the motor case being integrally assembled to the blower case with the flange portion sandwiched therebetween;

a stator core;

a plurality of pole teeth; and a plurality of motor coils formed around the pole teeth of the stator core, wherein an air blowing port is provided in a part of the flange portion so as to be opened to the blower case, an air blowing channel communicating with the air blowing port is formed between the motor board and the flange portion, which are assembled to the motor case, a heat exchanger, which is mounted on the motor board so as to be exposed toward the blower case from an opening of the flange portion, is provided in the air blowing channel and heat radiation is performed by starting the motor, obtaining a part of blown air by rotation of the impeller through the air blowing port, and directly blowing the blown air to the plurality of motor coils through the air blowing channel, to which the heat exchanger is provided, and circulating the blown air to the impeller.

2. The blower according to claim 1, wherein the air blowing channel circulates the blown air to the plurality of motor coils to the impeller via a plurality of through holes formed in a top surface of a rotor yoke.

3. The blower according to claim 2, wherein the rotor yoke integrally assembled to the rotor shaft is concentric with the impeller facing the rotor yoke so as to be aligned with the impeller in an axial direction within an internal diameter side housing space of the impeller.

4. The blower according to claim 1, wherein a rotor yoke integrally assembled to the rotor shaft is concentric with the impeller facing the rotor yoke so as to be aligned with the impeller in an axial direction within an internal diameter side housing space of the impeller.

\* \* \* \* \*